May 23, 1933.  C. C. BLAKE  1,910,880
FLEXIBLE CONNECTION
Filed Oct. 24, 1931   2 Sheets-Sheet 1
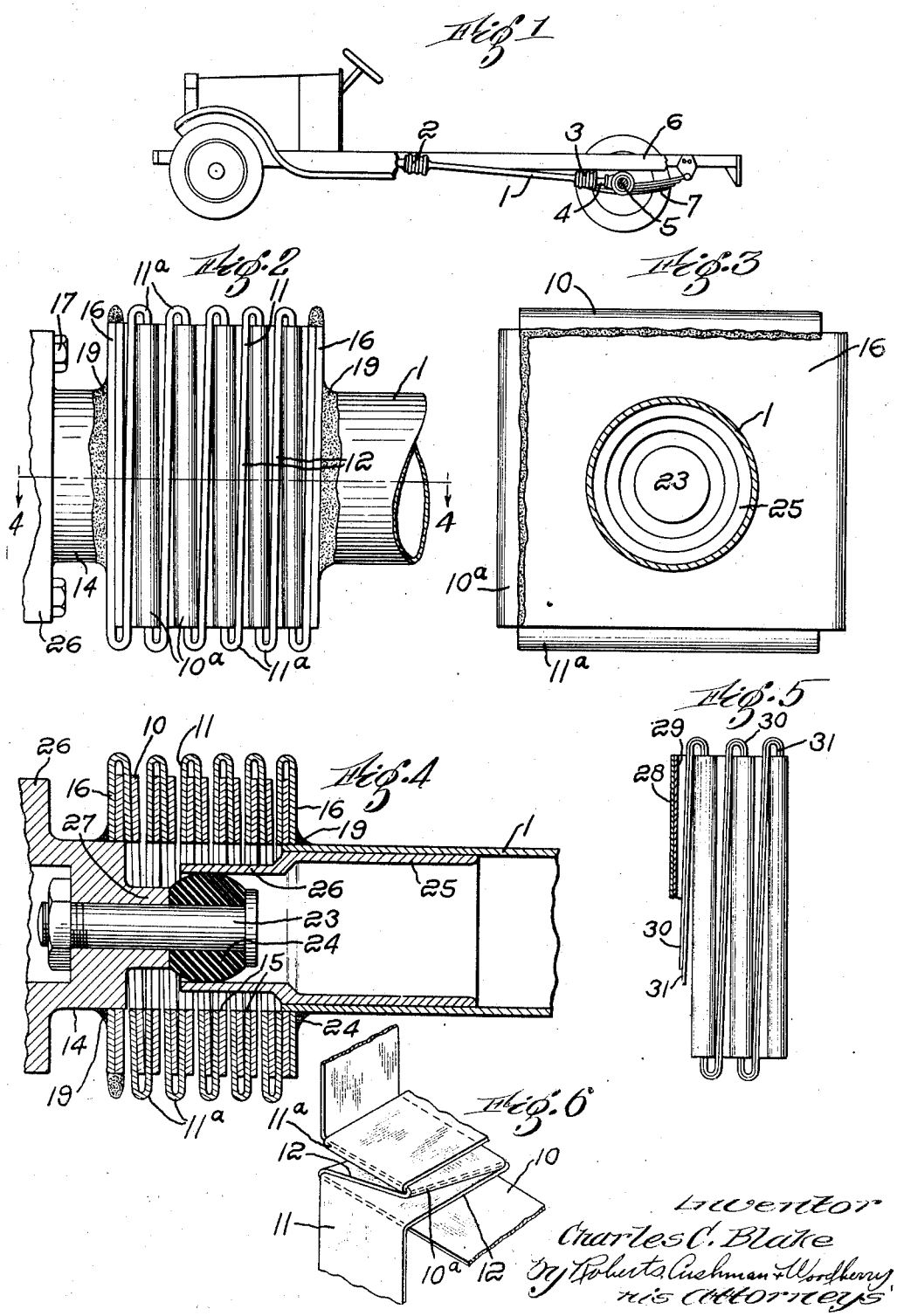

May 23, 1933.　　　C. C. BLAKE　　　1,910,880
FLEXIBLE CONNECTION
Filed Oct. 24, 1931　　　2 Sheets-Sheet 2
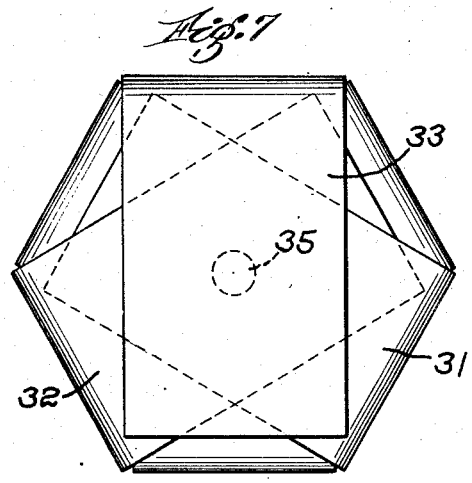
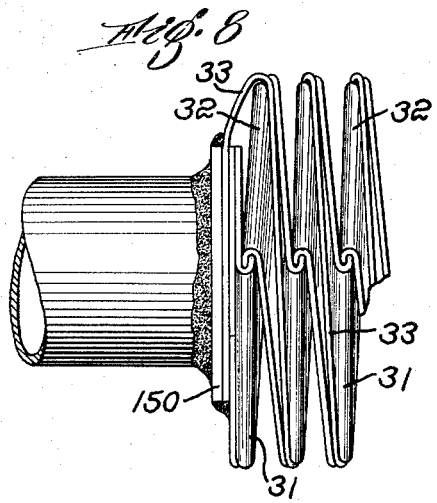
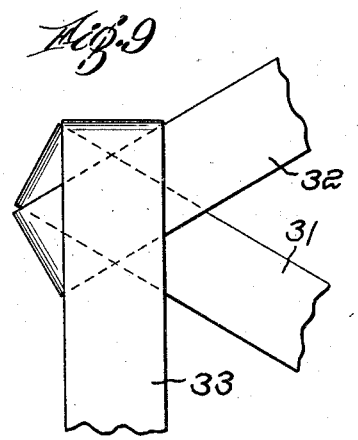
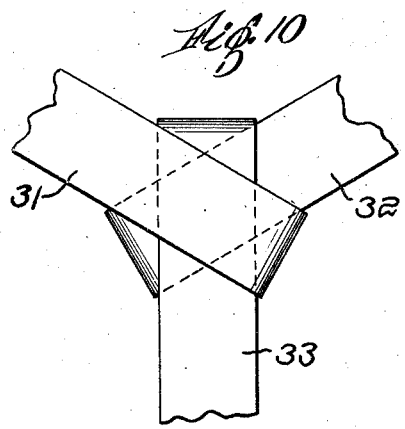
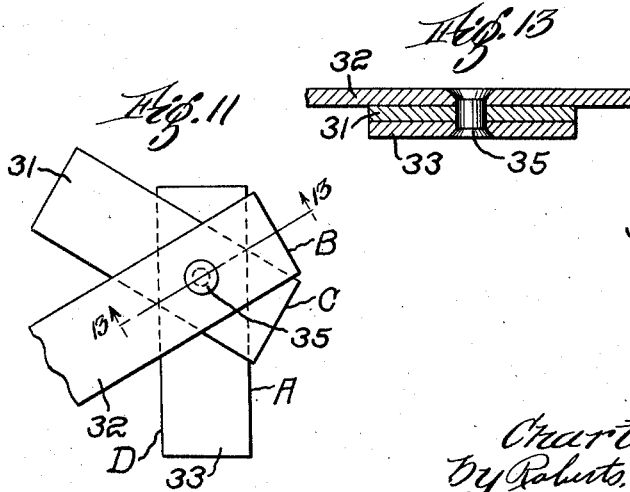
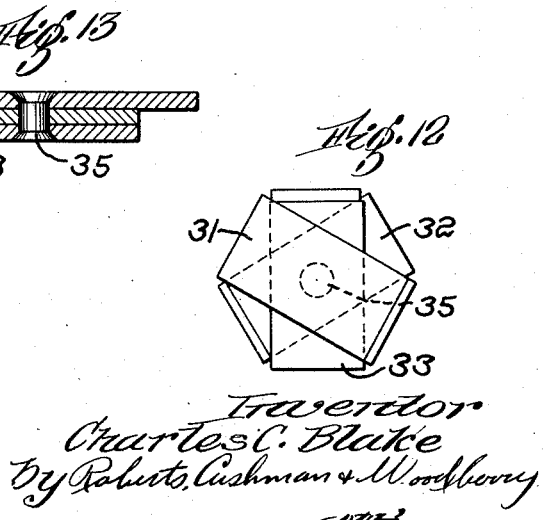
Inventor
Charles C. Blake
by Roberts, Cushman & Woodberry
Attys Patented May 23, 1933

1,910,880

UNITED STATES PATENT OFFICE

CHARLES C. BLAKE, OF KITTERY POINT, MAINE

FLEXIBLE CONNECTION

Application filed October 24, 1931. Serial No. 570,821.

This invention relates to improved types of flexible couplings such as universal joints and more particularly pertains to devices of this type which are formed of resilient strips.

Heretofore universal joints have generally been characterized by relatively moving sections with pivot elements therebetween that are subject to relatively high stresses and wear. A joint of this type requires frequent lubrication and tends to become loose and rattle objectionably after a period of use. Flexible connections have also been formed of various types of springs, fabric elements or the like, but have not generally proven satisfactory, especially where a relatively high torque must be transmitted as in the drive shafts of motor vehicles. The present invention affords a flexible connection which may be advantageously employed as a universal joint and which avoids the deficiencies of the pivot type of universal joints with their numerous wearing parts, propensity to rattle and necessity for frequent lubrication. Furthermore this drive means affords a slight flexibility in the drive shaft which permits a smooth starting action and protects the clutch against sudden shocks. In contrast to the flexible driving arrangement heretofore employed, the present invention affords a unit comprising resilient strips which may be inexpensively manufactured out of flat stock and which afford high circumferential stiffness or torsion transmitting ability, while providing longitudinal flexibility to permit expansion and contraction in directions parallel to the general axis or axes of rotation. Thus a heavy torque may be readily transmitted through a unit or shaft formed in accordance with the present invention and yet its flexibility longitudinally of the general axis of rotation permits the ready adjustment of the ends of the unit to rotational positions in different planes. Furthermore this arrangement provides a relatively stiff connection between the ends of shafts tending to hold the shaft centers in intersecting relation with each other so that centering elements which may be employed with the flexible unit need not be highly stressed and may be yieldable; for example, one of these elements may be formed of rubber. In fact a flexible unit of this character can be employed in the drive shaft of a motor vehicle without centering means of this character.

To permit these desirable results I preferably arrange flat strips of metal which are folded back and forth over each other to provide flat portions in substantial parallelism and with folds at each end of these flat portions, the ends of adjoining folds being juxtaposed and arranged so that the folds cooperate in providing a substantially continuous relatively stiff reinforcement extending the length of the unit and having a distorted, generally helical form. For example, two relatively flat metal strips may be folded in this manner to provide substantially flat and square sections with folds at either end of each of the sections and with a margin of each of the square portions between the folds of one strip engaged within the fold of an adjoining strip, the opposite edges of these square portions being relatively free and affording more flexible portions of the unit. The arrangement of the folds and the flat sections affords high stiffness not only in a generally circumferential direction, but also in a direction transversely of the axis of the rotary unit while stress imposed longitudinally upon the unit results in flexing not only of the square portions but a slight flexing of the folds so that considerable flexibility is afforded to permit the opposite ends of the unit to rotate readily in different planes while avoiding high unit stresses upon the bearings supporting the shaft. Rather than two flat strips a multiplicity of strips may be employed to provide a unit which is polygonal rather than square in cross section.

Preferably aligned openings are provided in the central substantially flat portions of the strips so that the unit is rendered relatively light and so that retaining or centering means to hold the heads or shafts connected to the ends of the unit may be disposed within the latter. Extensions of the shaft elements may extend through the openings in the relatively flat portions of the strips and are arranged in interfitting engagement with each other. Preferably, for example, one of these extensions affords a recess and the other carries a suitable ball-like element at its end in interfitting engagement with the recess, thus affording means holding the centers of the shaft elements in interconnecting relation. The ball-like element may be formed of a nonmetallic material such as a rubber composition so that no lubrication is required and so that rattling will not occur.

The ends of the metal strips may be welded in superposed relationship, in effect to form plates or heads which are connected to rotating shaft elements or any suitable rotating parts. Thus, for example, in the case of a universal joint, one of the heads thus provided may be welded to the drive shaft while the opposite head may be welded to the shaft element connected to the transmission or the differential.

In the accompanying drawings:

Fig. 1 is an elevational view with parts broken away of the chassis of a motor vehicle showing my improved flexible connections applied thereto;

Fig. 2 is an elevational view of my improved connection;

Fig. 3 is an end view of the connection shown in Fig. 2;

Fig. 4 is a section indicated by line 4—4 of Fig. 2;

Fig. 5 is an elevational view of an optional form of the invention;

Fig. 6 is a diagrammatic perspective view to illustrate the manner in which the strips are folded in engagement with each other.

Fig. 7 is an end view of a portion of an optional form of flexible unit;

Fig. 8 is a side elevation of a portion of the unit shown in Fig. 7 showing the latter connected to a rotary shaft;

Figs. 9 and 10 are elevational detail views illustrating the manner in which the strips are folded to provide the unit illustrated in Figs. 7 and 8;

Figs. 11 and 12 are similar views also showing the arrangement of retaining rivets which are disposed centrally in relation to certain of these strips; and Fig. 13 is a section on line 13—13 of Fig. 11.

A flexible unit or universal joint construct- ed in accordance with this invention may be employed in a wide variety of environments where it is desirable to transmit torque between shafts rotating about intersecting axes or axes out of alignment. Flexible means of this character, for example, may be employed to provide a flexible drive shaft between two rotating parts. For purposes of the present disclosure, however, I have illustrated the preferred use of my flexible unit as a universal joint and particularly in a motor vehicle. A flexible unit constructed in accordance with the present invention may be employed at both the front and rear ends of a conventional drive shaft where Hotchkiss drive is employed or it may be employed with a drive shaft surrounded by a torque tube and having only one universal joint at its front end.

In the accompanying drawings, Fig. 1 illustrates a typical arrangement of my universal joints at opposite ends of the drive shaft 1 of a motor vehicle, one of the flexible units 2 being located at front of this drive shaft and the second flexible unit 3 being located between the rear of the drive shaft and the stub shaft 4 projecting from the rear axle 5, each end of which is connected to the chassis frame 6 by a leaf spring 7. When the vehicle is driven over irregularities in the road surface, the springs 7 flex and the angularity of the drive shaft 1 changes, so that it is necessary for the joints or connections 2 and 3 to continue to transmit driving torque to the axle, and to permit ready movement of the axle in relation to the transmission and motor which are carried on the vehicle frame, furthermore the distance between the differential and transmission may vary slightly and connections 2 and 3 permit such longitudinal movements.

A flexible unit constructed in accordance with this invention may be formed of high quality spring stock, such as chrome vanadium steel. Preferably this stock has its parallel edges rounded and is annealed to remove the temper. The strips are then folded back and forth over each other in the manner diagrammatically illustrated in Fig. 6, the numeral 10 designating one strip and the numeral 11 designating the other strip. The strips are thus arranged so that they have substantially square flat portions which may extend in slightly diverging or substantially parallel planes with folds 10ª and 11ª of substantially 180° at the opposite ends of each of these flat portions. Each of these folds receives the edge of a flat section of the other strip, while the opposite edges of the flat portions of the strips may be relatively free, such free portions being designated by the numeral 12. After the strips are folded over each other in this manner the resulting unit may be annealed sufficiently to remove bending strains and then cooled slowly, for example, the annealing period may be of around an hour and the cooling period may continue for twelve hours. Then the annealed unit is reheated and tempered in an oil bath to restore the resiliency of thes trips. After the strips are folded upon each other, but before the final tempering, aligned openings 15 (Fig. 4) for example having a diameter of the order of one-half the distance between opposite folds, may be cut in the central portions of the square sections, accordingly, low stressed metal is removed from the central portion of the unit, thus to reduce its weight and to permit centering means and/or retaining means for the shafts to be located within the unit. If desired, this opening may be omitted, when the unit is to be employed for certain uses.

The ends of the strips 10 and 11 may be disposed in superposed engagement and welded to each other to provide plate portions 16 or heads at the ends of the unit. The heads may be joined in any suitable way to the shaft elements that are to be connected to the unit. For example, as shown the shaft element 14, having an annular flange 26 that may be connected by bolts 17 to a similar flange upon the transmission shaft, may be secured by a fillet weld 19 to one of the plates or heads 16, while a similar fillet weld 19 may connect the opposite head 16 to the drive shaft 1. Preferably the shaft elements 1 and 14 are provided with suitable extensions having portions in interfitting relationship with each other within the openings 15 of the flexible unit. If desired these extensions may be in normally spaced relationship to each other so that they do not contact during ordinary operation of the unit, but so that they provide means positively to prevent the end of the shaft from dropping to the ground should the unit break. Preferably, however, I provide the extensions in interfitting engagement with each other to assist in holding the shaft axes in proper intersecting relationship. As shown a boss 27 may project inwardly from the element 14 and a clamping bolt 23 may hold a ball-like element 24 against the end of the boss. A sleeve 25 may be fitted firmly within shaft 1 and may have a tubular or cylindrical extension 26 disposed within the flexible unit and engaging the ball-like element 24. The latter may be formed of any suitable material such as hardened steel but preferably is formed of non-metallic material such as a rubber composition, thus eliminating objectionable rattles and avoiding the necessity for lubrication.

Fig. 5 illustrates a modified form of the invention wherein a pair or more of flexible strips 28 and 29 may be superposed to take the place of one of the flexible strips shown in the other figures of the drawings while a similar pair of flexible strips 30 and 31 may be provided to take the place of the other flexible strip. Thus, in effect, laminated spring strips are employed instead of the arrangement shown in Fig. 2 and still greater flexibility is afforded to the unit.

It is evident that a unit of this character may be used where any flexible shaft is desired as well as in a universal joint, and such a use is to be regarded as coming within the purview of the following claims. The employment of the flat strips for a unit of this character permits a relatively inexpensive construction since flat stock is readily procurable and does not require the special manufacture of intricate shapes. The arrangement of the folds affords a reinforcement extending from one head of the unit to the other which is relatively stiff and adapted particularly to withstand torsional strains, thus allowing the unit to have a high torque transmitting ability. Each of the substantially square flat portions or strip sections within the unit has a metal fold at its opposite sides while one of its remaining margins is received in and reinforced by a fold of the other strip. The remaining or fourth margin of each of the square sections is free and has a relatively high flexibility, particularly in the general direction of the axis of rotation of the square section. Accordingly the unit is relatively stiff to oppose torsional strains and strains tending to move the axes of the shaft elements out of intersecting relation. Thus, for example, as shown in Fig. 2, the folds 10$^a$ and corresponding folds at opposite sides of the unit afford stiff ribs or reinforcing elements to oppose movement of the axis of shaft 1 out of alignment with the axis of shaft 14 in a direction parallel to the plane of the sheet. The folds 11$^a$ afford a similar stiff opposition to transverse movement at right angles to this direction. On the other hand longitudinal expansion and contraction of the whole unit can readily take place due to the ready flexing of the square sections which are disposed substantially in planes normal to the direction of such strains while the curved or folded portions 10$^a$ and 11$^a$ also facilitate such an expansion or contraction of the unit. Thus flexing will readily occur when the shaft elements change their angular and/or longitudinal relationship to each other. Accordingly the stresses upon bearings are not high although suitable transverse and torsional rigidity is afforded. Due to the natural transverse stiffness of this unit a centering arrangement of the type shown in Fig. 4, which does not require lubrication may be readily employed, and, in fact extensions of the shafts may be arranged out of contact with each other.

Figs. 7 to 12 inclusive illustrate an optional type of unit which may be formed from a plurality of strips, i. e. more than two strips. As shown three strips 31, 32 and 33 are folded back and forth over each other having their edges disposed in planes which are 60° to each other so that their ends define faces of the unit which are disposed at 120° to each other, thus providing the unit with a general hexagonal form. Fig. 9 illustrates the general position of the ends of the flat strips when they are thus being folded in superposed engagement.

Fig. 10 illustrates the disposition of the strips after strip 32 has been folded back over strip 33 while disposed at an angle of 60° to that strip and after strip 31 has been folded over strips 33 and 32 at an angle of 60° to each of these strips. Fig. 11 shows an end view of the strips folded back and forth over each other just before the ends of the strips are folded back over at the end of the unit 32. Preferably after the strips have been folded in this manner and before the metal is tempered, rivets 35 are disposed in engagement with central openings in the overlapping sections of the three strips. Thus each strip is provided with a fold portion forming a portion of the face or edge of the unit and substantially parallel flat portions at either side of the fold, these flat portions having central openings which are connected to each other by rivets. One edge of each flat portion is juxtaposed to the folds of the adjoining two strips and is received within such folds (note the position of edge A of strip 33 in Fig. 11 in relation to the folds B and C of strips 32 and 31 respectively). On the other hand the opposite edge of each flat section is free from close contact with the fold portions of the adjoining strips, (note the position of the edge D in Fig. 11). Fig. 12 illustrates the manner in which the ends of the strips may be arranged.

A unit of the type illustrated in Figs. 7 to 12 may have an end plate 150 of generally hexagonal form welded to the ends of the strips to provide a head which in turn may be welded to a rotary shaft such as shaft 1 in the same general manner as has been described with reference to the embodiment of the invention illustrated in Figs. 2 to 6.

A unit of this character is characterized by a substantially continuous relatively stiff portion formed by the adjoining folds which are arranged to provide a generally helical folded portion of the unit extending between its ends. The same general principles may be employed to provide a similar unit of a still larger number of strips. In other words the unit rather than being square or hexagonal may be in the form of a polygon of any desired number of sides; if desired, the folds may be disposed otherwise than at right angles to the edges of the strip so that successive flat sections do not have their edges in alignment; thus polygonal units having odd numbers of sides may be provided, or the folds may define irregular rather than straight faces of the unit. Obviously, the two strips folded over each other, as illustrated for example at 10 and 11 in Fig. 6, could be integrally united at one end of the unit as by being formed from a single strip doubled upon itself with the two free ends folded over each other as described, and the word "strips" as used in the claims is intended to define such strips integrally united at one end, as well as separate strips. The unit disclosed in Figs. 7 to 12 has the same general advantages as the square unit previously described, and is particularly advantageous since it permits a unit of relatively large diameter to be employed with its material disposed advantageously to receive high torque when the space for the unit is limited, as for example within a housing at the front end of a torque tube.

It is therefore evident that I have provided a flexible connection and more particularly a universal joint assembly which may be free from highly stressed contacting parts which require lubrication and which although depending upon the resiliency of its elements does not result in the subjecting of adjacent bearings to objectionably high stresses. This advantageous result is particularly facilitated due to the relatively high flexibility of the unit in response to longitudinal strains, and its relatively high stiffness to oppose transverse and torsional strains.

I claim:

1. A flexible shaft assembly comprising resilient, metal strips having adjacent substantially parallel flat portions and folds at opposite ends of said portions, the flat portions of the strips being in juxtaposition and the fold of one strip having its ends juxtaposed to the ends of adjoining folds, the ends of the strips being secured to each other to provide fastening heads and shaft elements connected to said heads.

2. A flexible shaft assembly comprising resilient, metal strips having adjacent substantially parallel flat portions and folds at opposite ends of said portions, the flat portions of the strips being in juxtaposition and the fold of one strip having its ends juxtaposed to the ends of adjoining folds, said portions of the strips having central openings therein, the ends of the strips being secured to each other to provide fastening heads, and shaft elements connected to said heads.

3. A universal joint assembly comprising resilient, metal strips having adjacent substantially flat parallel portions and folds at opposite ends of said portions, the flat portions of the strips being in juxtaposition and the fold of one strip having its ends juxtaposed to the ends of adjoining folds, said portions of the strips having central openings therein, fastening heads at the ends of the strips, and shaft elements connected to said heads, extensions projecting from the shaft elements and through the openings in said substantially parallel portions, one of said extensions having its end disposed within the other extension.

4. A universal joint assembly comprising resilient, metal strips having adjacent substantially parallel flat portions and folds at opposite ends of said portions, the flat portions of the strips being in juxtaposition and the fold of one strip having its ends juxtaposed to the ends of adjoining folds, said portions of the strips having central openings therein, fastening heads at the ends of the strips, and shaft elements connected to said heads, centering elements projecting from the shaft elements and through the openings in said substantially parallel portions, one of said centering elements having a ball at its end, the other of said elements having a recess in which the ball is received.

5. A universal joint assembly comprising resilient metal strips having adjacent substantially parallel portions and folds at opposite ends of said portions, the parallel portions of the strips being in juxtaposition and the fold of one strip having its ends juxtaposed to the ends of adjoining folds, said portions of the strips having central openings therein, fastening heads at the ends of the strips, shaft elements connected to said heads, centering elements projecting from the shaft elements and through the openings in said substantially parallel portions, one of said centering elements having a ball of yieldable material at its end, the other of said elements having a cylindrical recess in which the ball is received.

6. A universal joint assembly comprising shaft elements, and a flexible unit therebetween, said unit comprising substantially flat resilient metal strips with a series of substantially 180° folds with juxtaposed flat portions therebetween, the folds of each strip being parallel to each other and the flat portions of the strips having margins within the folds of another strip, the ends of the strips being secured in face-to-face engagement at the opposite ends of the unit, the shaft elements being secured to the ends of the unit.

7. A universal joint assembly comprising shaft elements, and a flexible unit therebetween, said unit comprising substantially flat, resilient, metal strips with a series of substantially 180° folds with juxtaposed flat portions therebetween, the folds of each strip being parallel to each other and the flat portions of each strip having margins within the folds of another strip, the flat portions having central openings therein with diameters substantially as great as one-half the distance between opposite folds, the ends of the strips being secured in face-to-face engagement at the opposite ends of the unit, the shaft elements being secured to the ends of the unit.

8. A universal joint assembly comprising shaft elements, and a flexible unit therebetween, said unit comprising substantially flat, resilient, metal strips with a series of substantially 180° folds with juxtaposed flat portions therebetween, the folds of each strip being parallel to each other and the flat portions of each strip having margins within the folds, the flat portions having central openings therein with diameters substantially as great as one-half the distance between opposite folds, the shaft elements being secured to the ends of the unit, a tubular extension secured to one of the shaft elements and projecting through the openings at one end of the unit, an extension projecting from the other shaft element through openings in the other end of the unit, said last-named extension having a ball-like element at its end disposed within the tubular extension.

9. A universal joint assembly comprising shaft elements and a flexible unit therebetween, said unit being formed of two resilient metal strips folded over each other with substantially flat square portions between opposite folds, the folds of one strip engaging the edges of flat portions of the other strip and the ends of the folds being juxtaposed to each other, so that the folds form a relatively stiff reinforcing portion of distorted helical form between opposite ends of the unit, each square portion having its ends stiffened by its own folds and one of its margins received in the fold of the other strip, the opposite margin being free to flex, whereby high torsional stiffness with relatively low longitudinal resistance is afforded.

10. A universal joint assembly comprising shaft elements and a flexible unit therebetween, said unit being formed of two resilient metal strips folded over each other with substantially flat square portions between opposite folds, the folds of one strip engaging the edges of flat portions of the other strip and the ends of the folds being juxtaposed to each other, so that the folds form a relatively stiff reinforcing portion of distorted helical form between opposite ends of the unit, each square portion having its ends stiffened by its own folds and one of its margins received in the fold of the other strip, the opposite margin being free to flex, whereby high torsional stiffness with relatively low bending resistance is afforded, the square portions having openings therein whereby the longitudinal resistance of the unit is reduced without material reduction in its torsional strength.

11. A universal joint assembly comprising shaft elements and a flexible unit therebetween, said unit comprising a plurality of resilient strips that have been folded back and forth over each other, the strips having juxtaposed flat portions with folds at opposite ends thereof extending substantially at right angles to the longitudinal edges of the strips, the folds of each strip having their ends juxtaposed to the ends of adjoining folds, whereby a generally helical reinforcement is provided between the ends of the unit, the folds defining faces of the unit and being arranged so that the unit has a cross section which substantially corresponds to that of a symmetrical rectilinear solid.

12. A universal joint assembly comprising shaft elements and a flexible unit therebetween, said unit comprising a plurality of resilient strips that have been folded back and forth over each other, the strips having juxtaposed flat portions with folds at opposite ends thereof extending substantially at right angles to the longitudinal edges of the strips, the folds of each strip having their ends juxtaposed to the ends of adjoining folds, whereby a generally helical reinforcement is provided between the ends of the unit, the juxtaposed flat portions of the strips crossing each other at similar angles of less than 90°, one margin of each flat portion being received in adjoining folds of the other strips, the folds defining faces of the unit and being arranged so that the unit has a cross section which substantially corresponds to that of a regular polygon.

13. A universal joint assembly comprising shaft elements and a flexible unit therebetween, said unit comprising a plurality of resilient strips that have been folded back and forth over each other, the strips having juxtaposed flat portions with folds at opposite ends thereof extending substantially at right angles to the longitudinal edges of the strips, the folds of each strip having their ends juxtaposed to the ends of adjoining folds, whereby a generally helical reinforcement is provided between the ends of the unit, the juxtaposed flat portions of the strips crossing each other at similar angles of less than 90°, fastening means connecting said juxtaposed flat portions intermediate the folds, one margin of each flat portion being received in adjoining folds of the other strips, the folds defining faces of the unit and being arranged so that the unit has a cross section which substantially corresponds to that of a regular polygon.

14. A universal joint assembly comprising shaft elements and a flexible unit therebetween, said unit comprising a plurality of resilient strips that have been folded back and forth over each other, the strips having juxtaposed flat portions with folds at opposite ends thereof extending subsantially at right angles to the longitudinal edges of the strips, the folds of each strip having their ends juxtaposed to the ends of adjoining folds, whereby a generally helical reinforcement is provided between the ends of the unit, the juxtaposed flat portions of the strips crossing each other at similar angles of substantially 60°, one margin of each flat portion being received in adjoining folds of the other strips, the folds defining faces of the unit and being arranged so that the unit has a cross section which substantially corresponds to that of a regular hexagon.

15. A flexible shaft assembly comprising rotatable shaft members, and a flexible unit therebetween, said unit including a plurality of metal strips folded back and forth over each other, each strip having a plurality of folds and substantially flat sections therebetween, the successive sections of one strip being in juxtaposition to similar sections of another strip, the folds of one strip having ends adjoining the folds of another strip, the ends of the strips being connected to said shaft members.

16. A flexible shaft assembly comprising rotatable shaft members, and a flexible unit therebetween, said unit including a plurality of metal strips folded back and forth over each other, each strip having a plurality of folds and substantially flat sections therebetween, the successive sections of one strip being in juxtaposition to similar sections of another strip, the folds of one strip having ends adjoining the folds of another strip, the central portions of said substantially flat portions having openings therein, one of said shaft elements having an extension projecting through certain of said openings and disposed within the end of the other shaft element, the folds providing a relatively stiff reinforcement of distorted helical form disposed outwardly of the openings and extending between the ends of the unit, said ends of the unit being secured to the shaft members.

Signed by me at Boston, Massachusetts, this 21st day of October, 1931.

CHARLES C. BLAKE.